United States Patent
Beesley

(10) Patent No.: US 6,363,985 B1
(45) Date of Patent: *Apr. 2, 2002

(54) ROTARY AIR COUPLING FOR TIRE INFLATION SYSTEM

(75) Inventor: Peter Alfred Beesley, Fort Wayne, IN (US)

(73) Assignee: Spice Technology, Inc., Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,653

(22) Filed: Apr. 18, 2000

(51) Int. Cl.[7] .................. B60C 23/10; B60C 29/00; F16J 15/34
(52) U.S. Cl. .................. 152/417; 152/415; 277/358
(58) Field of Search ................. 152/415, 416, 152/417; 277/358

(56) References Cited

U.S. PATENT DOCUMENTS

| | | | | |
|---|---|---|---|---|
| 3,468,259 A | * | 9/1969 | Morzynski et al. | 152/417 |
| 4,434,833 A | | 3/1984 | Swanson et al. | |
| 4,498,709 A | * | 2/1985 | Wells et al. | 152/416 |
| 4,582,107 A | * | 4/1986 | Scully | 152/417 |
| 4,754,792 A | | 7/1988 | Braun et al. | |
| 4,844,138 A | * | 7/1989 | Kokubu | 152/417 |
| 4,883,106 A | * | 11/1989 | Schultz et al. | 152/417 |
| 4,892,128 A | * | 1/1990 | Bartos | 152/417 |
| 5,354,391 A | | 10/1994 | Goodell et al. | |
| 5,484,213 A | | 1/1996 | Caillault et al. | |
| 5,503,480 A | | 4/1996 | Caillault et al. | |
| 5,868,881 A | * | 2/1999 | Bradley | 152/417 |
| 5,979,526 A | * | 11/1999 | Chamoy | 152/417 |
| 6,182,727 B1 | * | 2/2001 | Beesley | 152/417 |

* cited by examiner

Primary Examiner—S. Joseph Morano
Assistant Examiner—Jason R. Bellinger
(74) Attorney, Agent, or Firm—Liniak, Berenato, Longacre & White

(57) ABSTRACT

The present invention is directed to a rotary air coupling that distributes air to tires mounted on a rotating hub of a driven axle. The coupling is positioned adjacent the parking brake of a rear disk brake configuration. In the preferred design, the rotary member is connected to the hub and rotor assembly via rotor mounting bolts and a stationary component is disposed on the axle tube to provide a rotary air coupling that minimizes change to existing wheel assemblies.

16 Claims, 10 Drawing Sheets

ROTARY AIR COUPLING FOR TIRE INFLATION SYSTEM

BACKGROUND OF THE PRESENT INVENTION a) Field of the Invention

The present invention is directed to a rotary air coupling that provides a means to distribute air from an air supply to vehicle tires mounted on a rotating hub of a vehicle drive axle.

b) Description of Related Art

Automatic central tire inflation systems (CTIS) are becoming popular with the trucking industry. Various types of tire inflation system have been developed, both for trailer axles and tractor drive axles.

A central tire inflation system allows the operator to control the air pressure of the tires for improved performance of the tires and of the vehicle. However, the central tire inflation systems currently available suffer from two primary drawbacks. The axle and hub and possibly other parts must be extensively modified in order to accommodate a conventional system.

Central tire inflation systems in general are an important feature. Specifically, an off-road vehicle will often drive on soft, muddy surfaces and then switch to harder surfaces, such as paved roads. To obtain proper traction on soft, muddy surfaces, the tire should be operated at a relatively low pressure. To obtain proper traction and optimal fuel mileage on harder surfaces, the tires should be operated at relatively high pressures.

The differences between preferred high tire pressures (hard surfaces) and preferred low tire pressures (soft surfaces) may be quite large. For example, some truck tire manufacturers recommend a maximum tire pressure of 120 psi for highway conditions and 8 to 15 psi for extremely soft conditions such as sand, mud and swamps. A tire pressure for intermediate road conditions may be approximately 40 psi. Of course, in the case of trailers, the preferred tire pressure will also be dependent upon the weight of the goods or equipment carried in the trailer.

Another reason justifying the employment of central tire inflation systems is road surface deterioration. It is known that over-inflated tires are a major cause of road surface deterioration. Road repair and road building have become increasingly expensive and it is therefore foreseeable that governmental entities may begin penalizing the operators of trucks and tractor-trailers for operating equipment on public roads with improperly inflated tires or over-inflated tires.

Of course, another reason justifying central tire inflation systems is fuel economy. Soft tires on highways reduce gas or fuel mileage. A central tire inflation system that automatically controls the air pressures of trailer tires on a highway will increase fuel efficiency as well as improve road surface longevity.

Existing air distribution systems for tire inflation systems on drive axles direct the supply air through the bearings of the hub. Distribution through the bearings demand smaller bearings and require additional seals in the hub. The seal life is shortened due to the increased seal friction caused by pressure loading of the seal lips.

The need exists for a rotary air coupling designed to distribute supply air to the tires mounted on drive axles in which the air coupling is positioned externally of the drive axle and the hub bearings.

SUMMARY OF THE INVENTION

The present invention is particularly directed to a rotary air coupling designed to distribute supply air to the tires mounted on drive axles in which the air coupling is positioned externally of the drive axle and the hub bearings. Therefore, the improved rotary air coupling of the present invention by being mounted outside the bearings of the hub has no effect on existing hub bearings.

The present improved rotary air coupling takes advantage of the known dimension of existing wheel systems by connecting the stationary component of the coupling to the brake mounting plate directly or through the axle housing, while the rotary component of the coupling is press-fit onto the hub.

One of the advantages of the present invention is that the rotary coupling of the present invention does not interfere with the drive axle, bearings or lubrications as internal axle type air couplings can. Thus, there is no interference in the strength of existing vehicle components, which can lead to lengthy testing delays. Another advantage is the accessibility of the present rotary coupling. The present rotary coupling can be accessed as easily as brake shoes and will not cause mechanical difficulty in re-assembly.

The present invention is directed to an improvement in a rotary air coupling in a tire inflation system having a driven axle, a hub rotatable on hub bearings, a brake mounting plate, and a brake drum connected to the hub. The coupling includes an annular stationary housing positioned externally of the hub bearings, and connected to the brake mounting plate, and an annular rotatable housing positioned externally of the hub bearings and connected to the hub. Seal means are provided sealing between the stationary housing and the rotatable housing. An air supply inlet is connected to the stationary housing, and an air outlet is connected to the rotatable housing. The stationary housing and the rotatable housing include an air passageway therethrough communicating between the air inlet and the air outlet.

The present invention is further directed to the improvement in an air inflation system for tires on a vehicle having a driven axle with at least one pneumatic tire at each end of the axle, a hub rotatable on hub bearings, a brake mounting plate, and a brake drum connected to the hub of a rotary air coupling which distributes supply air to the tires. The rotary air coupling includes an annular stationary seal housing having a seal chamber with an radially facing opening in which the stationary housing is positioned externally of the hub bearings and connected to the brake mounting plate. The radially facing opening of the stationary seal housing and the radially facing opening of the rotatable seal housing are positioned adjacent to and face each other. A pair of stationary high pressure seals is provided having a sealing face and is positioned in the seal chamber of the stationary housing.

In an alternate embodiment, the present invention provides an improvement in a rotary air coupling in a tire inflation system having a driven axle, a hub rotatable on hub bearings, a brake mounting plate, and a brake drum connected to the hub. The alternative coupling includes a first annular housing mounted to the hub and rotor assembly using the rotor bolts, and a second annular housing press-fit on the axle tube. Seals are provided between the first housing and the second housing. An air supply inlet is connected to the stationary housing, and an air outlet is connected to the rotatable housing. The stationary housing and the rotatable housing include an air passageway therethrough communicating between the air inlet and the air outlet. For this alternate embodiment, compressed air passes through the same chamber as the parking brake is located in the rear disk brake configuration. This design allows for minimal change to existing production parts.

DETAILED DESCRIPTION OF THE PREFERRED EMBODIMENT

A central tire inflation system (CTIS) in which the air and rotating tires are controlled through an air connection between the trailer air supply and each of the tires on a driven axle and such a disclosure is provided by this invention.

Figure 1:
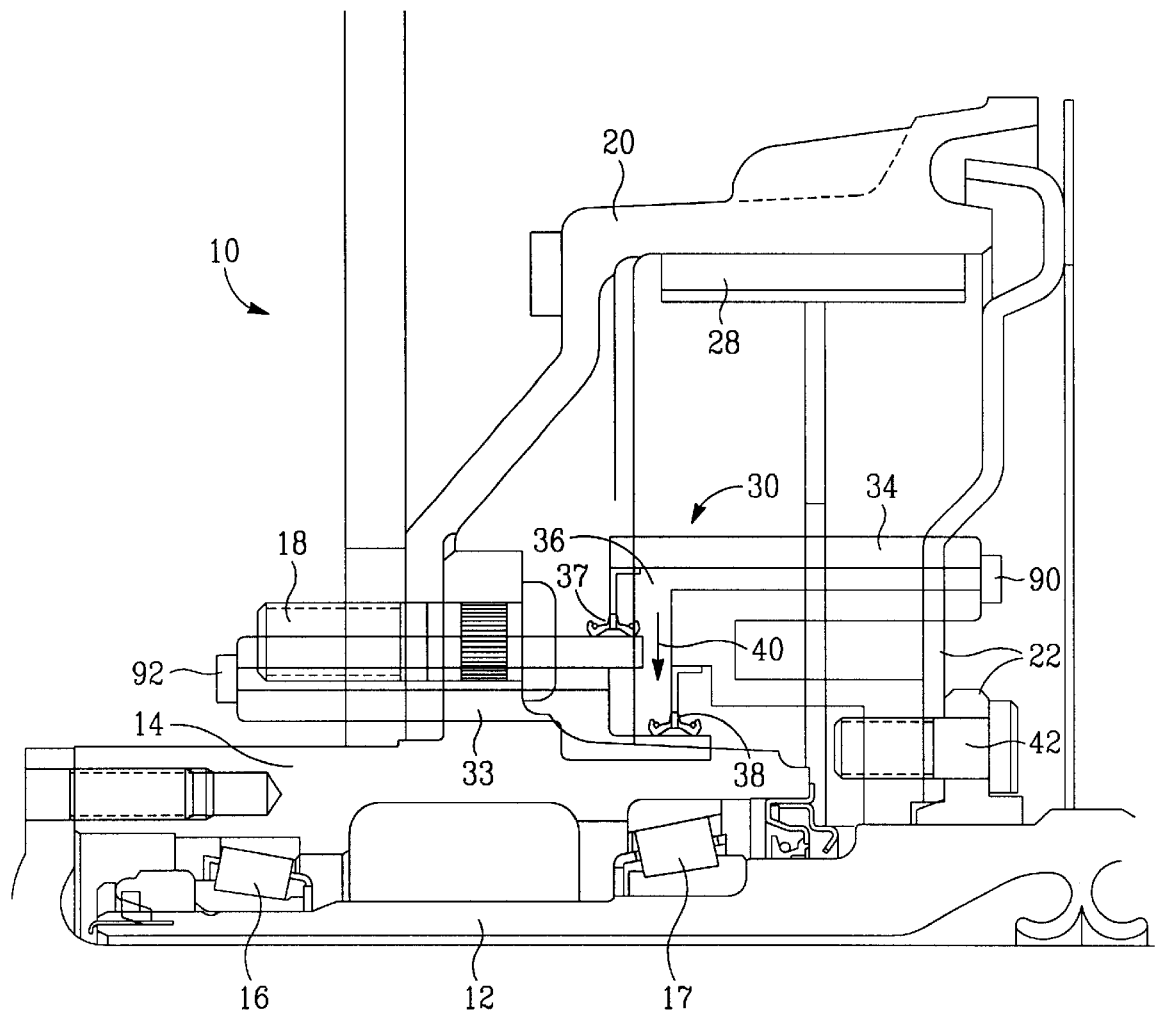
FIG. 1 is a half cross-sectional view of a driven axle type of wheel assembly with the rotary air coupling of the present invention.

Referring to FIG. 1, the reference numeral 10 generally indicates a wheel assembly of a driven axle vehicle having a driven axle or spindle within the axle housing 12 upon which a wheel hub 14 is supported therefrom by bearings 16 and 17. Lug bolts 18 extend from the hub 14 for receiving and supporting a wheel and tire (not shown), and a brake drum 20, all of which rotate. A stationary component includes a brake assembly including a mounting plate to which is connected the brake spider, the brake S cam and the brake shoe 28. The above components of the wheel and brake assembly are conventional.

The present invention is directed to providing a rotary air coupling generally indicated by the reference numeral 30 to distribute supply air from an air supply on the vehicle to tires mounted on the drive axle or spindle. Existing air distribution systems for tire inflation systems on drive axles direct the supply air through the bearings of the hub which require smaller bearings, additional seals, which causes the seal life to be shortened.

One of the features of the present rotary coupling 30 is that it does not interfere with the conventional drive axle and axle housing 12, bearings 16 and 17 or lubrication as do internal type axle couplings. Therefore, there is no interference in the strength of existing vehicle components. It is noted from FIG. 1 that the rotary air coupling 30 of the present invention is positioned around the outside of the axle housing 12 and externally of the hub bearings 16 and 17. However, the present air coupling 30 consists of a rotary or dynamic component 33 and a stationary or static component 34. It is important that the components 33 and 34 be closely aligned with tight tolerances; however, the various components in the wheel assembly 10 have variable and loose tolerances such a quarter of an inch or even greater. Nevertheless, the tolerances between the brake drum 20 and the brake shoe 28 must be maintained with close tolerances which requires that the tolerances between the brake mounting plate 22 and the hub 14 is a well defined dimensional relationship since the other brake members are interconnected from the brake mounting 22 and hub 14. Therefore, it is another feature of the present invention to support the stationary components 34 and the rotating component 33 of the coupling 30 from the brake mounting plate 22 and the hub 14, respectively, thereby allowing the components 33 and 34 to maintain the required close tolerances between themselves.

Figure 2:
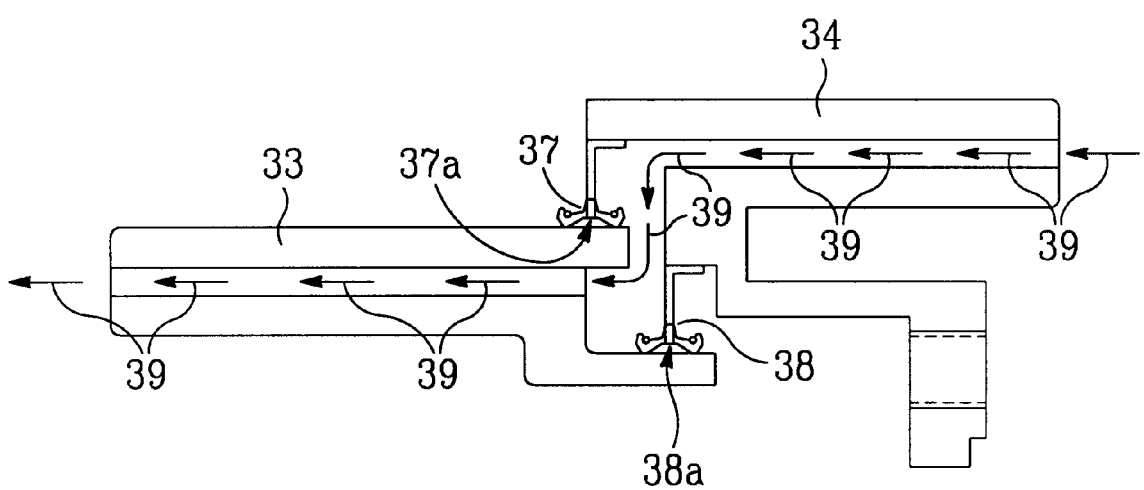
FIG. 2 is cross-sectional view of the rotational component and stationary component with the wheel and brake assembly being omitted.

Referring now to FIGS. 1 and 2, the stationary component 34 includes a stationary seal chamber 36 which, in conjunction with a pair of high pressure seals 37 and 38, defines a radially facing opening (see direction line 40). The stationary seal housing 36 is positioned externally of the hub bearing 16 and 17 and the axle housing 12, and is connected to the brake mounting plate 22 and supported therefrom such as by bolts 42. The pair of high pressure stationary ring seals 37 and 38 each having a sealing face 37a, 38a is positioned in the seal chamber 36 with each sealing face 37a, 38a oriented in the radial direction.

The high pressure seals 37, 38 are formed of a metal body portion that is press-fit into the annular opening of the components 33, 34. The sealing face 37a, 38a is formed with an appropriate spring-loaded rubber sealing member, and preferably Teflon or other wear resistant surface is provided at the sealing interface. In the preferred embodiment, the sealing member is designed to withstand a pressure spike of about 125–130 psi. Of course, the exact sealing specifications may be altered to satisfy the sealing conditions at hand.

Referring now to FIG. 2, the rotating component 33 and stationary component 34 are illustrated with the wheel and brake assembly omitted. The two radially oriented, high-pressure seals 37, 38 provide a sealed interface between the rotating and stationary components 33, 34; thereby defining an airflow path shown with a series of arrows 39 in FIG. 2.

Referring to FIGS. 1 and 2, an air supply inlet 90 is connected to the stationary component 34 and is adapted to be connected to the air supply on the vehicle thereby placing air in communication with the tire via the air path shown in FIG. 2. The air outlet port 92 provides a connection via lines (not shown) to the pneumatic tires (not shown).

Figure 3:
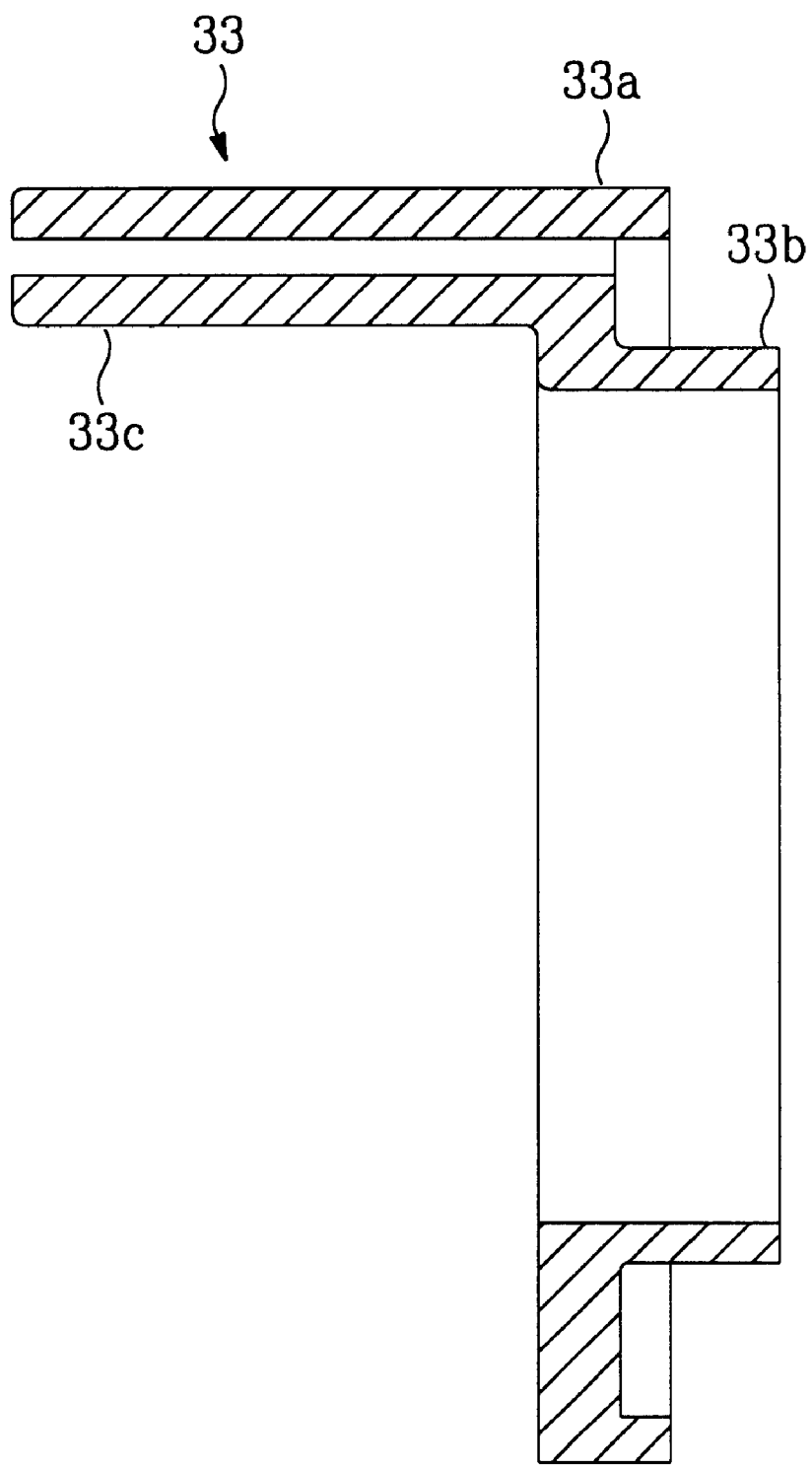
FIG. 3 is a cross-sectional view of the rotational component.
Figure 4:
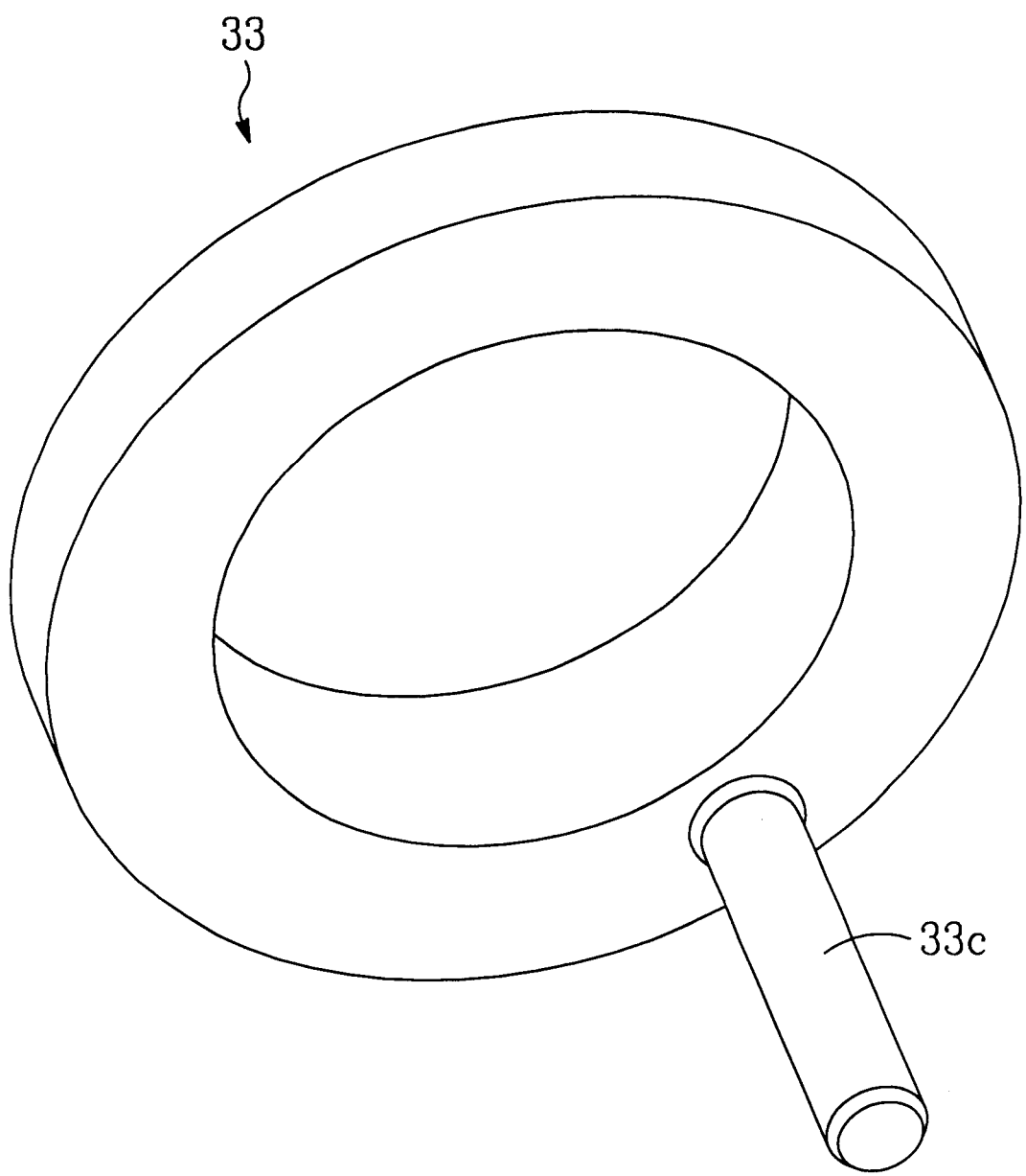
FIGS. 4 and 5 are perspective views of the rotational component of FIG. 3.
Figure 5:
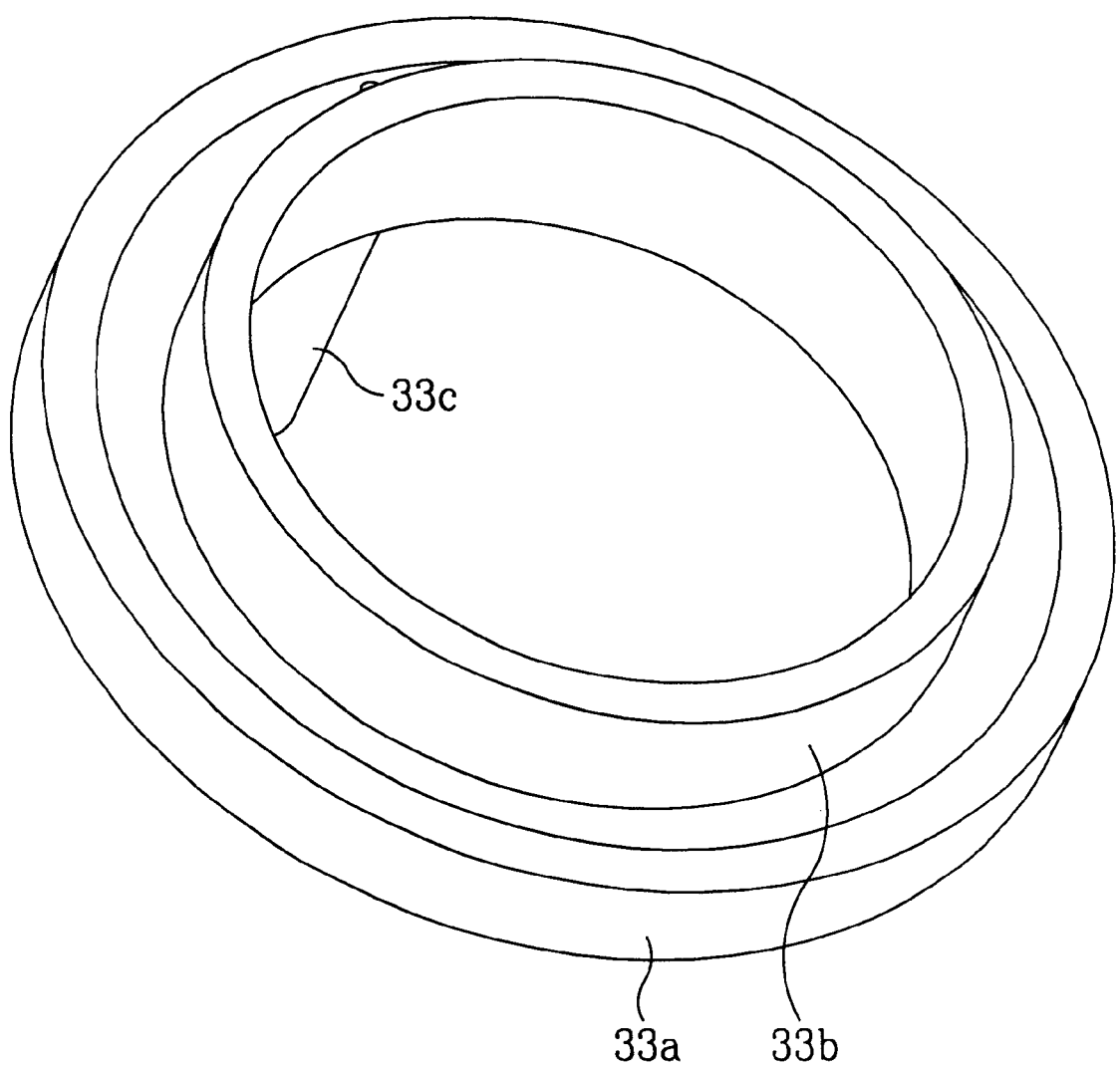

FIG. 3 is a cross sectional view of the rotational component 33 showing an annular hub portion with seal engaging surfaces 33a, 33b, and a cylindrical delivery member 33c. FIGS. 4 and 5 are perspective views of the rotational component 33 of FIG. 3.

Figure 6:
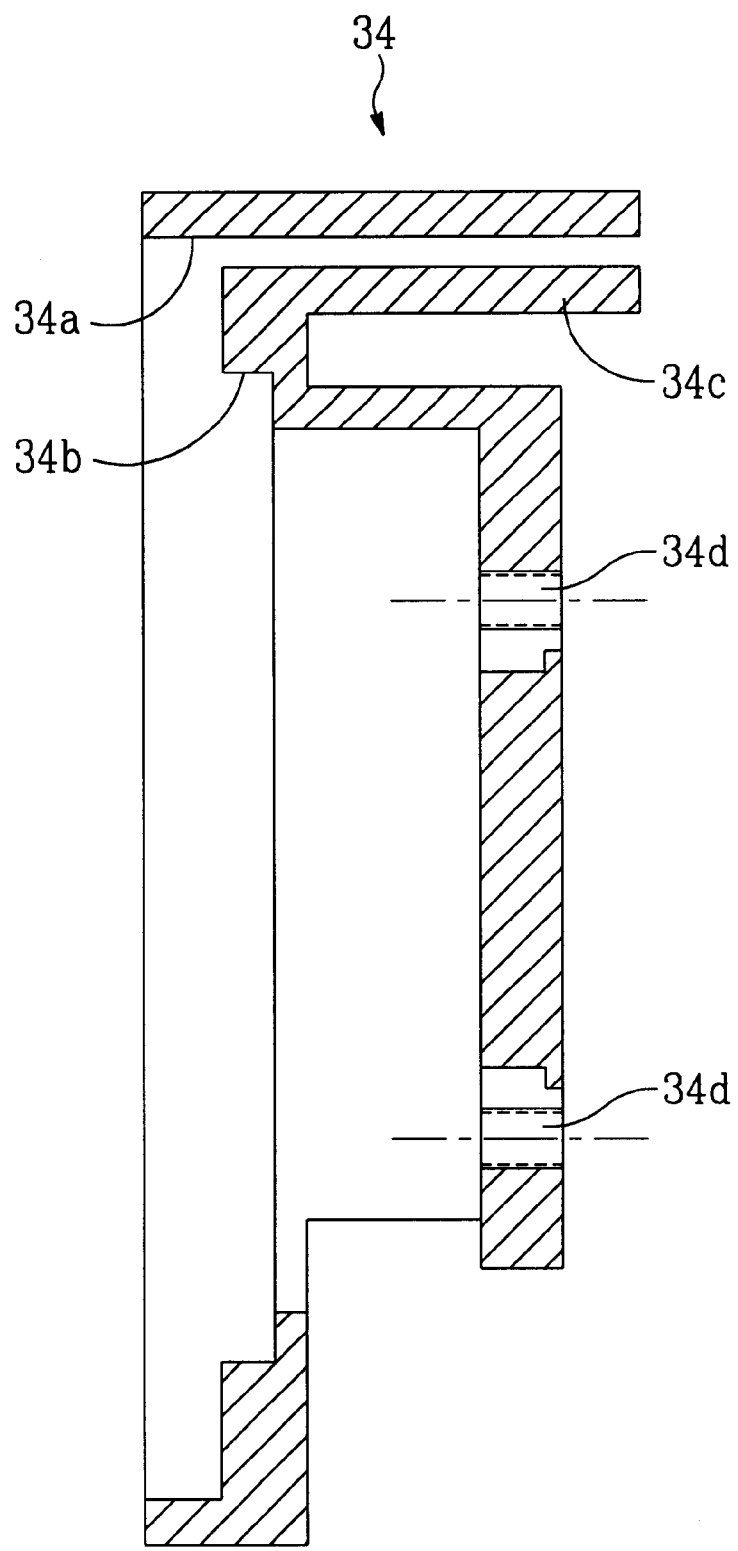
FIG. 6 is a cross-sectional view of the stationary component.
Figure 7:
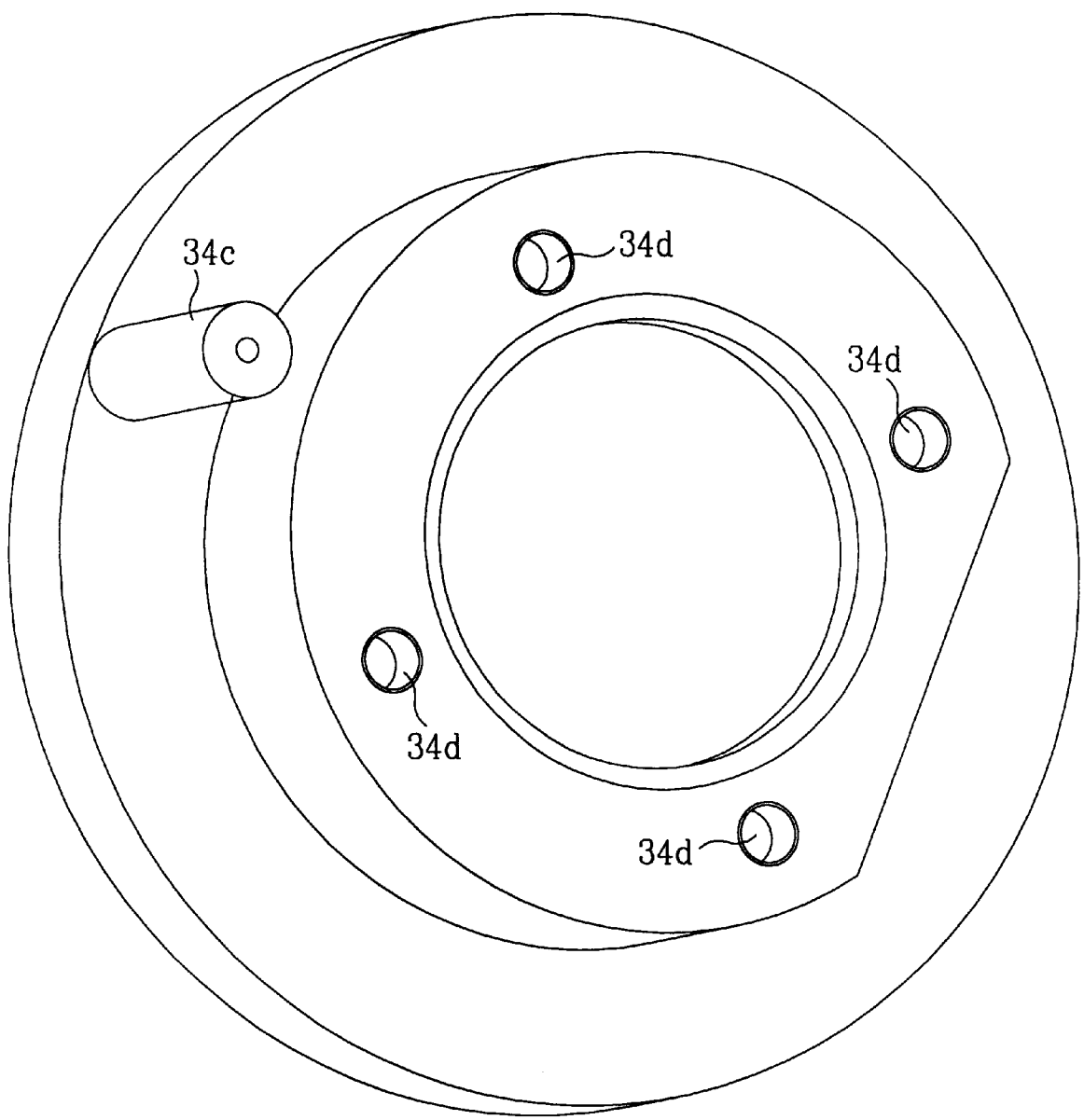
FIGS. 7 and 8 are perspective views of the stationary component of FIG. 6.
Figure 8:
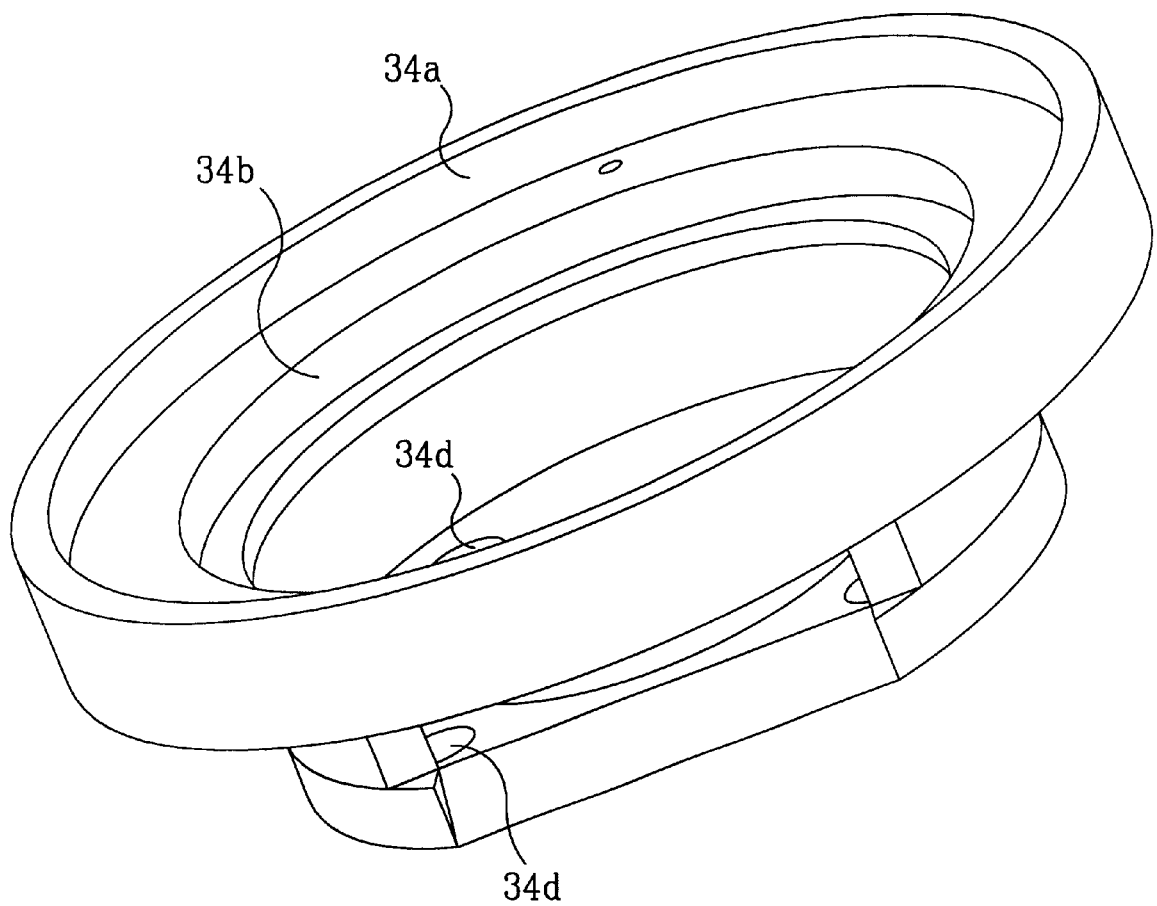

FIG. 6 is a cross sectional view of the stationary component 34 showing an annular hub portion with seal mounting surfaces 34a, 34b, and a cylindrical delivery member 34c. The stationary member is mounted to a brake mounting member via mounting holes 34d receiving the bolts 42. FIGS. 7 and 8 are perspective views of the stationary component of FIG. 6.

In operation, the present air coupling may be conveniently located outside of the axle and connected to known dimension parts; the stationary component is preferably connected to the brake mounting plate 22 by the bolts 42, and the rotational component 33 is preferably press-fit onto the hub to thereby rotate with the tire. These components 33, 34 are mounted with the assurance that the tolerances of these available mounting services are always tightly controlled because it is important that the brake shoes 28 be aligned with the drum 20. The location of these components also has the advantage of accessibility. The coupling 30 does not interfere with the drive axle or axle housing 12, bearings 16 and 18, or lubrication. The rotary union 30 can be accessed as easily as the brake shoes and may be easily reassembled and there is no interference with the existing vehicle components. An airline is connected to the vehicle air supply and connected to the inlet connection 90 to provide a supply air for supplying to the rotatable tires. Suitable air lines are connected between the tires and the outlet 92.

The vehicle air supply will now be described. The onboard tire pressure inflation system may comprise a control which will typically be located in the vehicle operator's cab. The control may have a lever which is selectively movable to two or more positions for selecting a desired tire pressure. Typically, in a heavy duty vehicle, in highway (i.e. over-the-road) conditions it is desired that the driving tires be inflated to a pressure of about 75 pounds per square inch, in off-the-road conditions it is desired that the driving tires be inflated to a pressure of about 40 pounds per square inch and for desert operating conditions it is desired that the tires be inflated to a pressure of about 8–14 pounds per square inch. Of course, other pressures and/or other settings may be selected by the control and will fall within the scope of the present invention. The control may also include an infinitely variable control member whereby the operator may select any pressure within a given range of pressures. The control is attached to a pressure regulator by a line which may be hydraulic and/or electric or the like. The pressure regulator is connected to a source of pressurized fluid by a fluid connection and to a vent or exhaust. The pressure regulator will supply selectively pressurized fluid to the inlet 90 which communicates with the tire inflation structure shown in FIG. 1. Pressure regulator is effective to supply pressurized fluid to fluid connections, or to vent fluid connections, in accordance with the setting of control. A pressure gauge may also be provided, preferably in the operator's cab, indicating the pressure level of pressurized fluid in the system. Typically, the pressurized fluid will be pressurized air and the source of pressurized fluid will be the vehicles onboard air system and/or a pressurized air accumulator.

Therefore, as the wheels rotate, air from the air supply flows through the inlet, into the chamber 36, past the high pressure seals 37, 38 while their seal faces engage to the rotational component 33 to prevent escape of the air, into the rotational component 33, and out of the outlet connection 92 to the tires.

As apparent from the foregoing description, the system of this invention consists of two machined pieces (the rotational component and stationary component) and two high pressure seals. The rotational component is designed to press fits onto the hub and rotates with the wheel. The stationary component pilots on the axle tube and is mounted using the brake assembly mounting bolts; the stationary member also holds the two high pressure seals in place.

Figure 9:
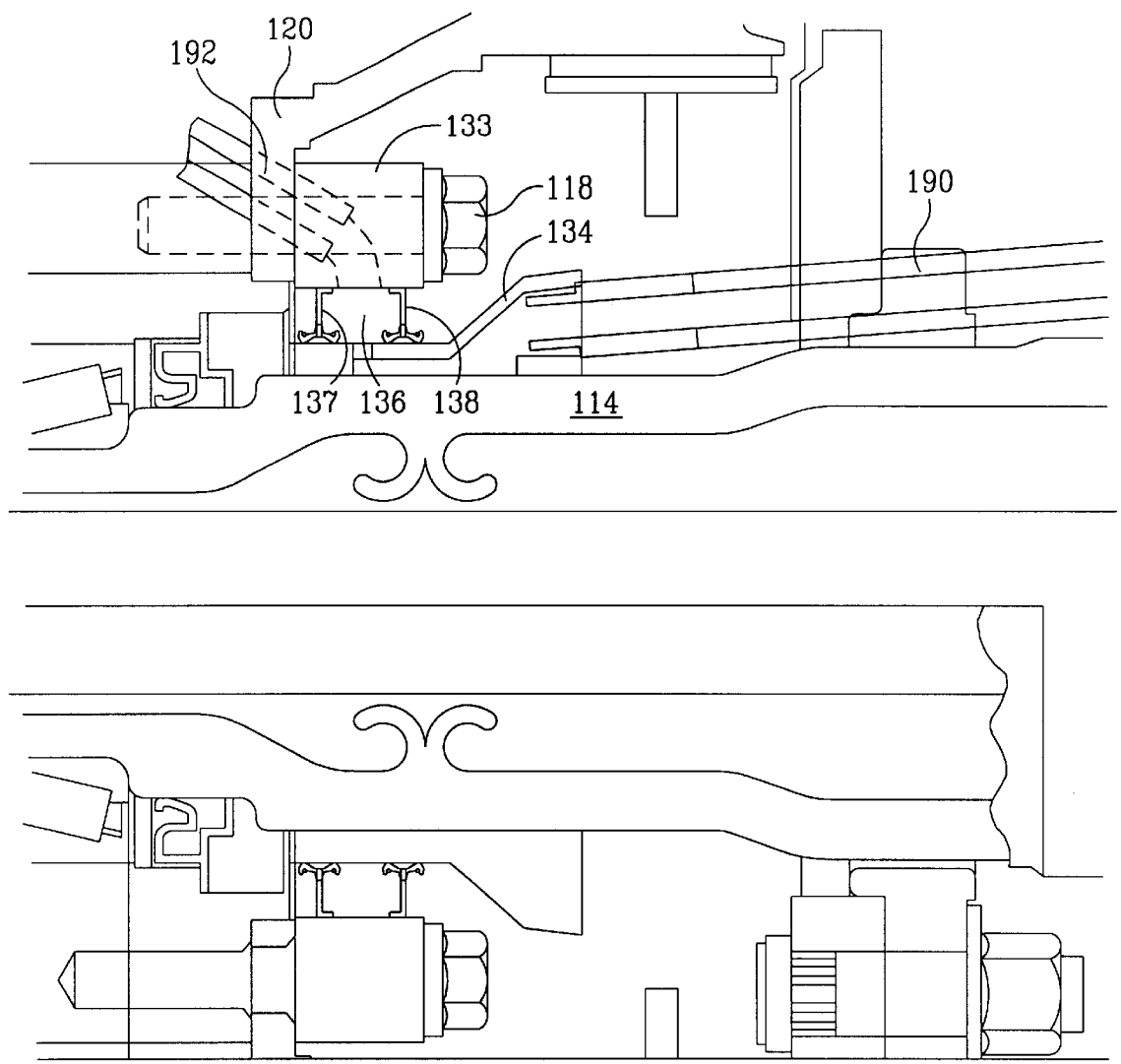
FIG. 9 is a cross-sectional view of a wheel assembly according to an alternate embodiment of the present invention.
Figure 10:
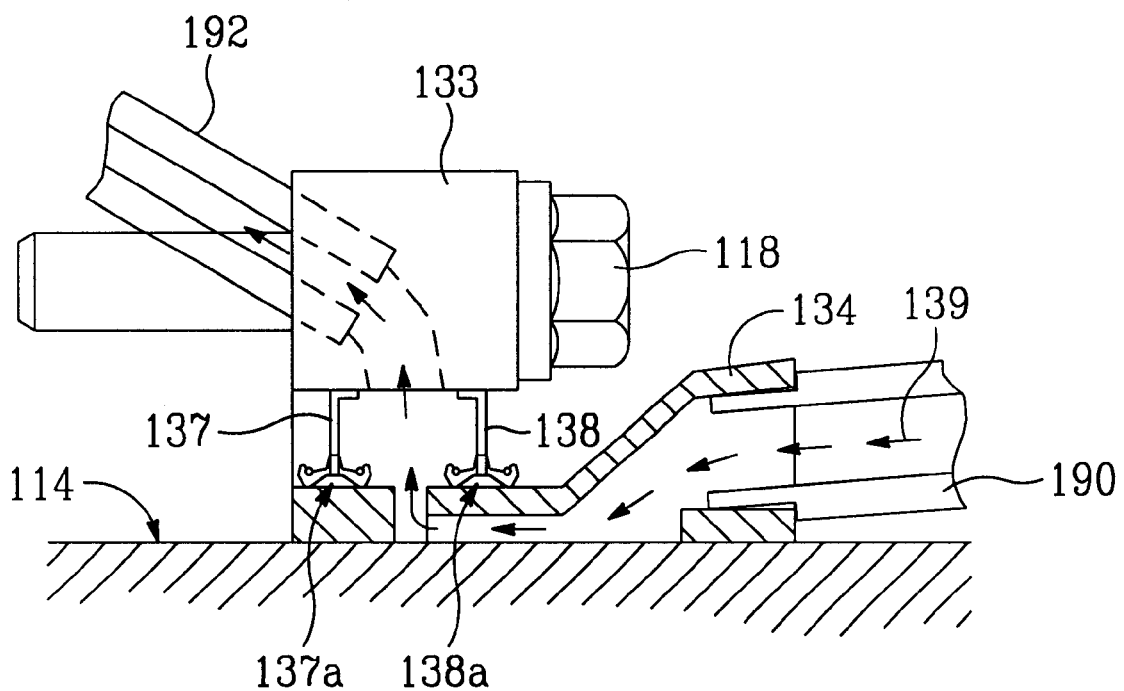
FIG. 10 is an enlarged sectional view showing the seal assembly of the embodiment of FIG. 9.

Referring now to FIGS. 9 and 10, an alternate embodiment of the present invention will be described. For this alternate embodiment, a first annular component 133 is mounted onto the hub and rotor assembly, and the second annular component 134 is press fit onto axle tube 114. The first annular component 133, in conjunction with a pair of high pressure seals 137 and 138, defines a radially facing sealing chamber. The first annular component 133 is connected to the hub and rotor assembly 120 and supported therefrom such as by bolts 118. The pair of high pressure stationary ring seals 137 and 138, each having a sealing face 137a, 138a, are positioned in the sealing chamber 136 with each sealing face 137a, 138a oriented in the radial direction.

The high pressure seals 137, 138 are formed of a metal body portion that is press-fit into the annular opening of one of the components 133, 134. In FIGS. 9 and 10, the seals 137, 138 are press fit onto the first component 133. Each sealing face 137a, 138a is formed with an appropriate spring-loaded rubber sealing member, and preferably a Teflon or other wear resistant surface is provided at the sealing interface. In the preferred embodiment, the sealing member is designed to withstand a pressure spike of about 125–130 psi. Of course, the exact sealing specifications may be altered to satisfy the sealing conditions at hand.

Referring now to FIG. 10, the first component 133 and the second component 134 are illustrated with the wheel and brake assembly omitted. The second component 134 is press-fit onto the outer radial surface of the axle tube 114 and that outer radial surface helps define the path of airflow for this tire inflation system. The two radially oriented, high-pressure seals 137, 138 provide a sealed interface between the rotating and stationary components 133, 134; thereby defining an airflow path shown with a series of arrows 139 in FIG. 10.

Referring to FIGS. 9 and 10, an air supply inlet 190 is connected to the second component 134 and is adapted to be connected to the air supply on the vehicle thereby placing air in communication with the tire via the air path shown in FIG. 10. The air outlet port 192 provides a connection via lines (not shown) to the pneumatic tires (not shown).

To inflate the tire(s), a positive pressure is applied to the inboard side of the stationary component. Air is thereby delivered to the rotational component through the interface created by the two high-pressure seals. A hose then delivers the air to the tire for inflation. To deflate the tire(s), a negative pressure is applied to the inboard side of the stationary component; thereby reducing the air pressure in the tire(s).

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts will be readily apparent to those skilled in the art and which are encompassed within the spirit of the invention and the scope of the appended claims.

What is claimed is:

1. A tire inflation system for a vehicle including an axle defining an axis of rotation and a radial direction, at least one pneumatic tire mounted on a hub with bearings, a brake mounting plate, and a brake drum connected to the hub, said tire inflation system comprising, a first annular member having a first air port and a seal chamber in communication with said first air port, said seal chamber defining a radially oriented opening, said first annular member adapted to be mounted onto an axle tube, at least one radially extending seal member mounted within said seal chamber of said first annular member;

a second annular member rotatably supported relative to said first annular member and having a second air port and at least one radially facing surface abutting said at least one seal member, said second annular member adapted to be mounted to a hub and rotor assembly, wherein said first annular member, said at least one radially extending seal member and said second annular member substantially define an air delivery passageway extending from said first air port to said second air port.

2. The tire inflation system of claim 1, wherein said at least one radially extending seal member comprises two radially extending seal member extending in parallel relation to one another between said first annular member and said second annular member.

3. The tire inflation system of claim 1, wherein said at least one radially extending seal member is fixedly mounted to said second annular member whereby said first annular member rotates relative to said seal member.

4. The tire inflation system of claim 1, wherein said first annular member comprises a first annular hub and a first cylindrical communication member having a first air delivery passageway formed therein.

5. The tire inflation system of claim 1, wherein said first annular member comprises at least one seal mounting surface extending circumferentially around and facing radially toward said axis.

6. The tire inflation system of claim 1, wherein said second annular member comprises a second annular hub and a second cylindrical communication member having a second air delivery passageway formed therein.

7. The tire inflation system of claim 1, wherein and interface between said axle tube and said first annular member defines an inner radial surface of said first air delivery passageway.

8. The tire inflation system of claim 1, further comprising an air supply system including a source of pressurized air and a control system for controlling delivery of said pressurized air to said first air port.

9. A tire inflation system for a vehicle including an axle defining an axis of rotation and a radial direction, said air inflation system comprising:

a hub rotatably mounted on hub bearings;

at least one pneumatic tire mounted on said hub;

an axle tube circumscribing said axle, a first annular member having a first air port and a seal chamber in communication with said first air port, said first annular member positioned on said axle tube, a second annular member rotatably supported relative to said first annular member and having a second air port, said second annular member being mounted to rotate with said hub;

at least one radially extending seal member mounted between first and second annular members;

wherein said first annular member, said at least one radially extending seal member and said second annular member substantially define an air delivery passageway extending from said first air port to said second air port.

10. The tire inflation system of claim 9, wherein said at least one radially extending seal member comprises two radially extending seal members extending in parallel relation to one another between said first and second annular members.

11. The tire inflation system of claim 9, wherein said at least one radially extending seal member is fixedly mounted to said second annular member whereby said first annular member rotates relative to said seal member.

12. The tire inflation system of claim 9, wherein said first annular member comprises a first annular hub and a first cylindrical communication member having a first air delivery passageway formed therein.

13. The tire inflation system of claim 12, wherein said first annular hub comprises at least one seal mounting surface extending circumferentially around and facing radially away from said axis.

14. The tire inflation system of claim 9, wherein said second annular member comprises a second annular hub and a second cylindrical communication member having a second air delivery passageway formed therein.

15. The tire inflation system of claim 14, wherein said second annular hub comprises at least one seal engaging surface circumscribing said axis and facing radially toward said axis.

16. The tire inflation system of claim 15, wherein said at least one radially extending seal member is mounted to said at least one seal mounting surface of said second annular hub and engages said at least one seal engaging surface of said second annular hub.

* * * * *

UNITED STATES PATENT AND TRADEMARK OFFICE
CERTIFICATE OF CORRECTION

PATENT NO. : 6,363,985 B1  
DATED : April 2, 2002  
INVENTOR(S) : Beesley

Page 1 of 1

It is certified that error appears in the above-identified patent and that said Letters Patent is hereby corrected as shown below:

<u>Title page,</u>
Item [73] Assignee: [Spice] <u>Spicer</u> Technology, Inc., Fort Wayne, IN (US)

Signed and Sealed this

Twenty-eighth Day of May, 2002

*Attest:*

JAMES E. ROGAN
*Attesting Officer*    *Director of the United States Patent and Trademark Office*